J. Q. BLACK.
TRUCK FOR MOTOR DRIVEN VEHICLES.
APPLICATION FILED SEPT. 13, 1920.
1,375,892.
Patented Apr. 26, 1921.
3 SHEETS—SHEET 1.
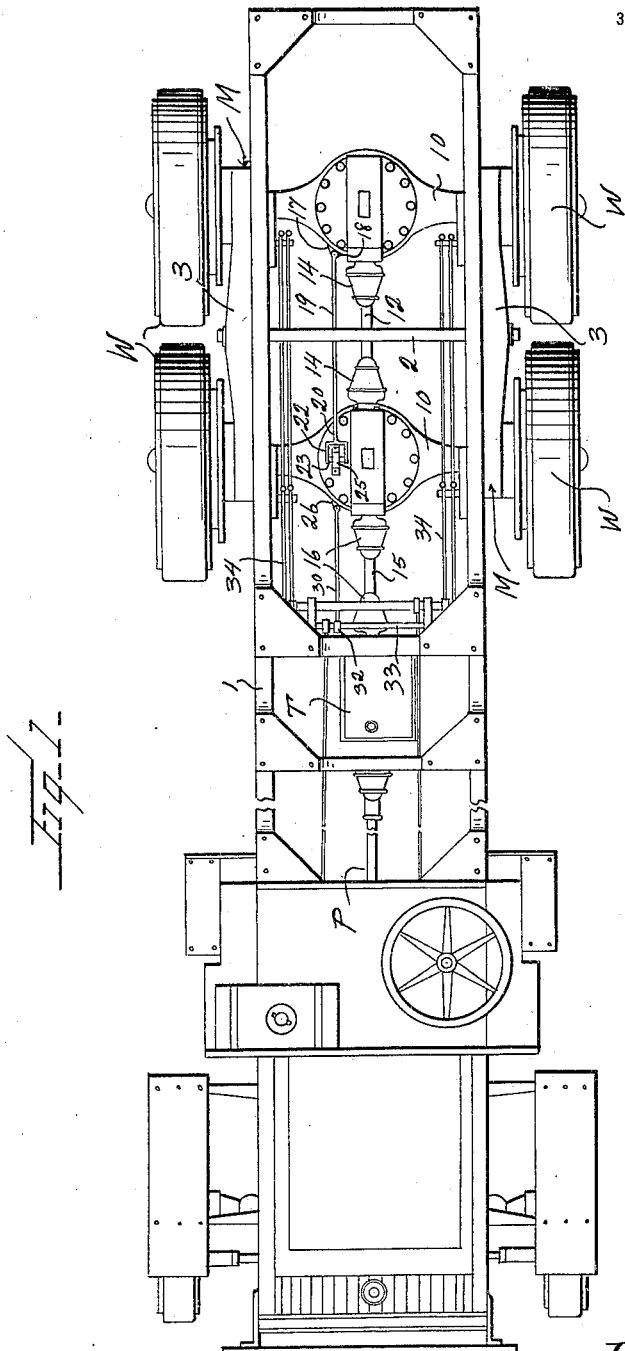
INVENTOR.
J. Q. Black
BY
Watson E. Coleman
ATTORNEY.

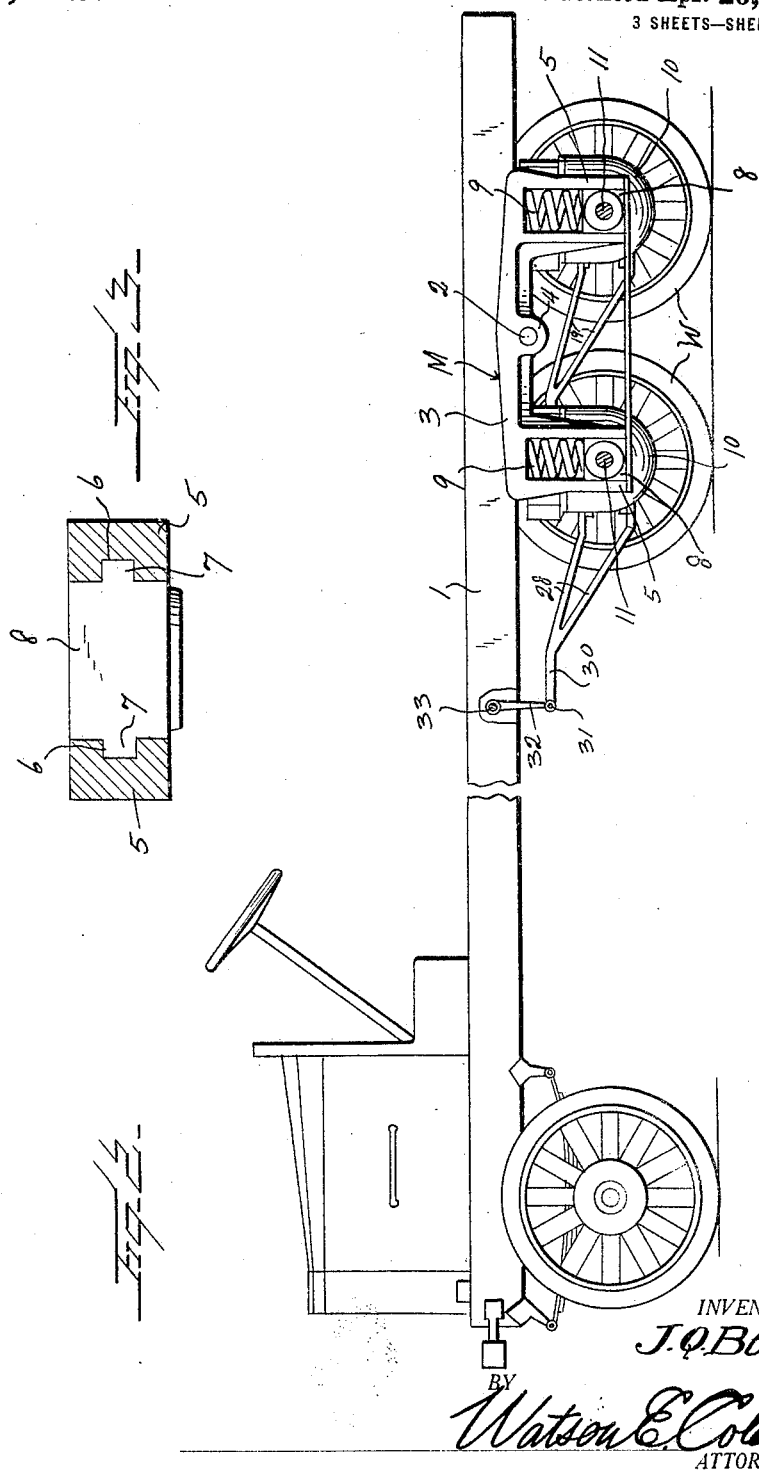

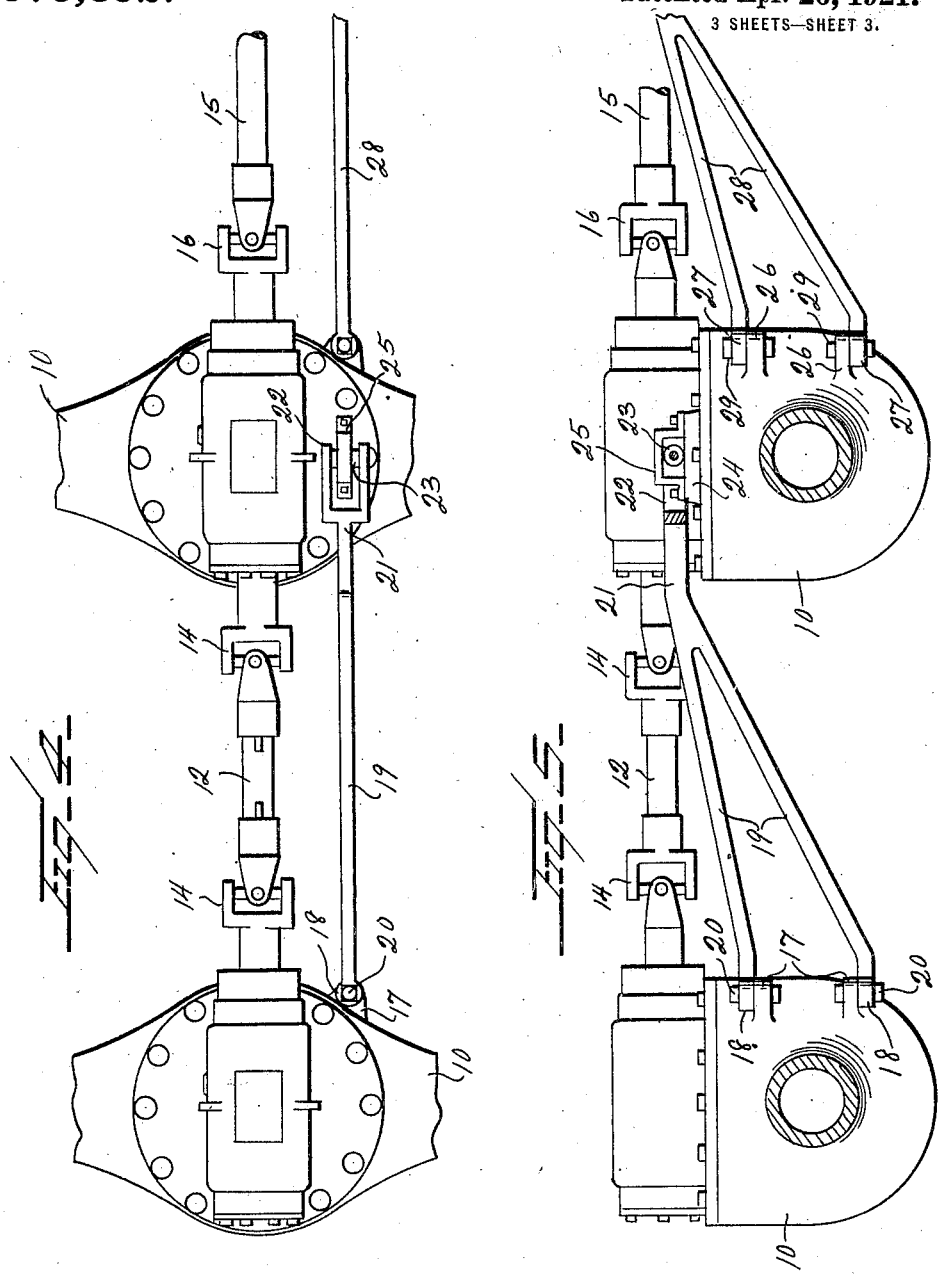

UNITED STATES PATENT OFFICE.

JOHN Q. BLACK, OF NASHVILLE, TENNESSEE.

TRUCK FOR MOTOR-DRIVEN VEHICLES.

1,375,892. Specification of Letters Patent. Patented Apr. 26, 1921.

Application filed September 13, 1920. Serial No. 409,875.

*To all whom it may concern:*

Be it known that I, JOHN Q. BLACK, a citizen of the United States, residing at Nashville, in the county of Davidson and State of Tennessee, have invented certain new and useful Improvements in Trucks for Motor-Driven Vehicles, of which the following is a specification, reference being had to the accompanying drawings.
This invention relates to certain improvements in rear trucks for motor driven vehicles and has relation more particularly to a device of this general character embodying a four-wheel drive, and it is an object of the invention to provide a truck of this general character embodying novel and improved means whereby all of the wheels are in tractive engagement with the surface over which the vehicle is traveling irrespective of any inequalities or irregularities which may be in such surface.

Another object of the invention is to provide a novel and improved device of this general character embodying side frames supported for swinging movement in a vertical direction, together with pairs of drive wheels supported by said side frames at points spaced longitudinally of the vehicle, with a transmission shaft coacting with each pair of wheels, together with means for preventing the transmission shaft and its concomitant parts coacting with the drive wheels from being thrown out of requisite assembly.
The invention consists in the details of construction and in the combination and arrangement of the several parts of my improved rear truck for motor driven vehicles whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:
Figure 1 is a view in top plan illustrating a motor vehicle having applied thereto a truck structure constructed in accordance with an embodiment of my invention.

Fig. 2 is a view in side elevation of the structure as illustrated in Fig. 1 with certain of the parts omitted.

Fig. 3 is an enlarged horizontal sectional view taken through an end column comprised in a side frame, the co-acting bearing being in top plan.

Fig. 4 is a fragmentary view in top plan illustrating means for holding the casings for the transmission mechanisms coacting with the drive wheels from having rotary movement which would otherwise derange the operative connection between the transmission shaft and the drive wheels, and Fig. 5 is a fragmentary view in side elevation of the structure as illustrated in Fig. 4.

As disclosed in the accompanying drawings, 1 denotes the side members or beams of the frame or chassis of a motor driven vehicle of any desired type. Disposed through the rear portions of the members or beams 1 is a rod or shaft 2 of a length to extend beyond the outer face of each of the members or beams 1, whereby said rod or shaft 2 serves as a support for a rear four-wheel drive truck.

The truck embodies two side members M. Each of the side members M, as herein disclosed, comprises a substantially horizontally disposed elongated body member 3 provided at substantially its longitudinal center with a depending lug or flange 4 through which an extended end portion of the rod or shaft 2 is disposed and whereby the member M is supported at its central portion for rocking movement in a vertical direction.

The opposite end portions of the body member 3 of the member M are provided with the depending columns comprising the vertically disposed spaced arms or plates 5 having their opposed faces in parallelism. Said opposed faces of the arms or plates 5 are also provided with the parallel grooves or channels 6 extending longitudinally thereof or in a vertical direction and in which are slidably engaged the outstanding ribs or flanges 7 carried by the opposite end faces of a bearing block 8.

Interposed between the upper face of each of the blocks 8 and the body 3 between the arms or plates 5 is a coil spring 9 of requisite tension and which yieldably supports the rear portion of the chassis of the motor driven vehicle and the load carried thereby.

Interposed between each pair of transversely alined bearing blocks 8 and substantially bridging the space therebetween is a casing 10 in which is housed any desired type of differential mechanism for the drive shafts 11. The shafts 11 are disposed through the bearing blocks 8 and have fixed thereto in a conventional manner the driving wheels W.

The front and rear differentials are operatively connected by a supplemental transmission shaft 12 of articulated type and wherein the adjacent sections are operatively connected through the instrumentality of the universal joints 14, whereby compensation is afforded for the relative movements of the casings 10 and the mechanisms therein and particularly in a vertical direction when the wheels W are traveling over an uneven surface. By having the side members M supported for rocking movement, it will at once be understood that the wheels W at all times will have tractive engagement with the surface over which the vehicle is traveling irrespective of any unevenness or irregularities therein, so that at all times the wheels W will properly and effectively perform their functions.

It has been fully demonstrated in practice that it is of special advantage to have the transmission shaft 12 provided with two universal joints 14 one positioned in close proximity to a casing 10.

The differential mechanism arranged within the forward casing 10 has operatively engaged therewith a transmission shaft 15 also articulated and having adjacent sections connected by the universal joints 16. The transmission shaft 15 is operatively engaged with the transmission mechanism generally indicated at T and which mechanism is operatively engaged with a propeller shaft P.

It has also been found, in practice, of advantage to have comprised in the the transmission shaft 15 two universal joints 16, one in relatively close proximity to the forward casing 10 and the second in relatively close proximity to the transmission mechanism T.

It is of utmost importance to provide means whereby the casings 10 are held against rotary movement as otherwise the driving connections as afforded by the transmission shafts 12 and 15 will become deranged and particularly incident to the rocking movement of the side members M. The rear casing 10 preferably at one side of its longitudinal center but relatively close thereto is provided with a pair of vertically spaced and alined ears 17 and which overlap the eye members 18 arranged at the rear end portions of the rods 19. Disposed through the ears 17 and the eye members 18 are the pintles or bolts 20 which permit the casing 10 to have movement in the direction of its axis. As is particularly illustrated in Fig. 5, it is preferred that the upper eye member 18 be arranged above its coacting ear 17 and the lower eye member 18 be positioned below its coacting ear 17.

The arms 19 are disposed forwardly in convergence and have their converging ends integrally formed with a forwardly directed extension or arm 21 of a length to overlie the top of the central portion of the forward casing 10. The forward or free end portion of the extension or arm 21 is formed into a fork 22 between the arms of which at the free end portions thereof is rotatably supported a roller 23 riding upon a track plate 24 suitably fixed to the casing 10. The roller 23 also extends within a holding bracket 25 herein disclosed as bolted or otherwise secured to the track plate 24.

The connection between the casings 10 as afforded by the arms 19 and 21 effectively serves to hold the rear casing 10 against rotary movement.

The forward casing 10 at a point slightly to one side of its longitudinal center is also provided with a pair of vertically spaced and alined ears 26 and overlapping the ears 26 are the eye members 27 carried by the rear end portions of the arms 28. Disposed through the eye members 27 and the ears 26 are the pintles or bolts 29 whereby the forward casing 10 is also permitted to have movement in the direction of its axis. The arms 28 are disposed upwardly and forwardly in convergence and the converging ends thereof are integrally formed with and continued by an arm 30. The forward or free end portion of the arm 30 is pivotally engaged, as at 31, with a link 32 depending from and loosely mounted upon the transversely directed shaft 33 comprised in the brake mechanism.

It is also preferred that the upper eye member 27 overlie its coacting ear 26 and the lower eye member 27 underlie its coacting ear 26.

The brake mechanism may be of any type preferred except that the rods 34 coacting with the brake bands are also articulated in order to compensate for the relative movements of the drive wheels W.

From the foregoing description it is thought to be obvious that a rear truck for motor driven vehicles constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a vehicle frame, side members pivotally engaged therewith for swinging movement in a vertical direction, columns depending from the opposite end portions of each of the side members, bearing blocks arranged in each of the columns, said column and block having relative movement in a vertical direction, driving shafts disposed through the bearing blocks, wheels mounted thereon, a differential mechanism coacting with each pair of transversely related shafts including a casing, a driving connection between the differential mechanisms, a driving means coacting with one of the differential mechanisms, means coacting with the casings of both of the differential mechanisms for holding one of said mechanisms against rotary movement, means coacting with the casing of the second differential mechanism and the frame for holding said second casing against rotary movement, the means for holding the first named casing against rotary movement comprising a pair of arms hingedly connected with the casing at vertically spaced points, said arms converging toward the second casing and continued by an arm overlying the second casing, a roller carried by the second arm and riding upon the second casing, and a holding bracket overlying the roller.

2. In combination with a vehicle frame, side members pivotally engaged therewith for swinging movement in a vertical direction, columns depending from the opposite end portions of each of the side members, bearing blocks arranged in each of the columns, said column and block having relative movement in a vertical direction, driving shafts disposed through the bearing blocks, wheels mounted thereon, a differential mechanism coacting with each pair of transversely related shafts including a casing, a driving connection between the differential mechanisms, a driving means coacting with one of the differential mechanisms, means coacting with the casings of both of the differential mechanisms for holding one of said mechanisms against rotary movement, means coacting with the casing of the second differential mechanism and the frame for holding said second casing against rotary movement, the means for holding the first named casing against rotary movement comprising a pair of arms hingedly connected with the casing at vertically spaced points, said arms converging toward the second casing and continued by an arm overlying the second casing, said second named arm overlapping the second named casing, and means for holding said second named arm and second named casing against relative movement in a vertical direction.

3. In combination with a vehicle frame, side members pivotally engaged therewith for swinging movement in a vertical direction, columns depending from the opposite end portions of each of the side members, bearing blocks arranged in each of the columns, said column and block having relative movement in a vertical direction, driving shafts disposed through the bearing blocks, wheels mounted thereon, a differential mechanism coacting with each pair of transversely related shafts including a casing, a driving connection between the differential mechanisms, a driving means coacting with one of the differential mechanisms, means coacting with the casings of both of the differential mechanisms for holding one of said mechanisms against rotary movement, means coacting with the casing of the second differential mechanism and the frame for holding said second casing against rotary movement, the means for holding the first named casing against rotary movement comprising a pair of arms hingedly connected with the casing at vertically spaced points, said arms converging toward the second casing and continued by an arm overlying the second casing, a roller carried by the second arm and riding upon the second casing, a holding bracket overlying the roller, the means for holding said second named casing against rotary movement comprising a pair of arms hingedly connected to said second named casing at vertically spaced points, said arms converging and being continued by an arm, and a link depending from the frame and pivotally engaged with the last named arm.

In testimony whereof I hereunto affix my signature.

JOHN Q. BLACK.